United States Patent [19]

Wu

[11] Patent Number: 5,538,681

[45] Date of Patent: Jul. 23, 1996

[54] DRYING PROCESS TO PRODUCE CRACK-FREE BODIES

[75] Inventor: Shy-Hsien Wu, Horseheads, N.Y.

[73] Assignee: Corning Incorporated, Corning, N.Y.

[21] Appl. No.: 304,540

[22] Filed: Sep. 12, 1994

[51] Int. Cl.$^6$ ............................ B29C 71/00; B29C 47/88
[52] U.S. Cl. ............................ 264/432; 264/430; 264/63; 264/66; 264/234; 264/177.12; 264/211.12; 264/104; 264/105
[58] Field of Search ..................... 264/26, 63, 104, 264/66, 105, 122, 177.12, 177.11, 211, 211.11, 234, 430, 431, 432, 433, 434

[56] References Cited

U.S. PATENT DOCUMENTS

| | | | |
|---|---|---|---|
| 3,885,977 | 5/1975 | Lachman et al. | 106/62 |
| 5,273,692 | 12/1993 | Numoto et al. | 264/26 |
| 5,328,657 | 7/1994 | Kamel et al. | 419/36 |
| 5,413,753 | 5/1995 | Zahr | 419/36 |
| 5,447,694 | 9/1995 | Swaroop et al. | 422/171 |

Primary Examiner—Christopher A. Fiorilla
Attorney, Agent, or Firm—L. Rita Quatrini

[57] ABSTRACT

A method for making a dried crack-free body involves forming a wet mixture of powder which can be ceramic, glass-ceramic, glass, molecular sieve, activated carbon, and combinations thereof, plasticizing organic binder which can be cellulose ethers, and/or their derivatives, and vehicle of water and at least one of the additional components of oleic acid, linoleic acid, linotenic acid, ricinoleic acid, or their derivatives, the vehicle content being at least about 35% by weight based on the powder content. The mixture is formed into a green body and dried. If the powder is conducting, the drying is done by a controlled humidity drying procedure which involves i) heating the green body at a temperature of about 35° C. to 90° C. at a relative humidity of about 90% to 95% for a time of about 1 to 7 hours, and thereafter ii) heating the green body at a temperature at about 88° C. to 95° C. at a relative humidity at about 90% to 95% for about 1 to 7 hours. If the powder is non-conducting the drying is done by either microwave or dielectric drying.

21 Claims, No Drawings

DRYING PROCESS TO PRODUCE CRACK-FREE BODIES

This invention relates to a method of forming bodies from plastic mixtures in which a new vehicle composition allows for a drying schedule of much shorter drying time than what has been used up to this time. Moreover, the drying shrinkage is substantially reduced resulting in crack-free bodies without adversely affecting the theology of the forming mixtures or the properties of the body even after heat-treating or sintering.

BACKGROUND OF THE INVENTION

Bodies made of ceramic material, activated carbon, and zeolite are used in a variety of applications such as catalytic or substrates for catalysts, adsorption of hydrocarbons and other impurities from gas streams (frequently air) and liquids, etc.

One common method of making these bodies is by shaping a plasticized mixture of the respective powders, binders, etc. carried in a vehicle. Normally, the vehicle is water. The shaped bodies are dried and often heat-treated. If the powders have a very high surface area, which is most often the case with activated carbon and molecular sieve particularly zeolite, and when water is the vehicle, a very large amount of water is needed to adequately wet the powders and binders. Hence, the drying time can be very long, e.g., normally about 4 days at about 95° C. for bodies made of activated carbon. The long drying time is needed to prevent rapid loss of a large amount of water which results in non-uniform shrinking and cracking in the body, thus undermining its strength, length of life, and catalytic and adsorption properties.

Therefore, it would be advantageous to be able to accomplish drying in a shorter time and at the same time avoid non-uniform shrinking and cracks and preserve properties of strength, life and adsorption and catalytic properties.

The present invention provides a method of forming these bodies which achieves these results.

SUMMARY OF THE INVENTION

In accordance with one aspect of the invention, there is provided a method for making a dried crack-free body which involves forming a wet mixture of powder which can be ceramic, glass-ceramic, glass, molecular sieve, activated carbon, and combinations thereof, plasticizing organic binder which can be cellulose ethers, and/or their derivatives, and vehicle of water and at least one of the additional components of oleic acid, linoleic acid, linolenic acid, ricinoleic acid, or their derivatives, the vehicle content being at least about 35% by weight based on the powder content. The mixture is formed into a green body and dried. If the powder is conducting, the drying is done by a controlled humidity drying procedure which involves i) heating the green body at a temperature of about 35° C. to 90° C. at a relative humidity of about 90% to 95% for a time of about 1 to 7 hours, and thereafter ii) heating the green body at a temperature at about 88° C. to 95° C. at a relative humidity at about 90% to 95% for about 1 to 7 hours. If the powder is non-conducting the drying is done by either microwave or dielectric drying.

DETAILED DESCRIPTION OF THE INVENTION

The present invention relates to a method of making bodies of ceramic, glass-ceramic, glass, activated carbon and molecular sieve, especially zeolite. A plastic mixture of the powders, binders, vehicle is shaped into a green body which is then dried and heat-treated or sintered.

By replacement of part of the water vehicle with a high boiling water-immiscible component such the organic acids as oleic acid, linoleic acid, ricinoleic acid, or their derivatives or any combination of these, (most typically a 1:1 by weight replacement), drying can be accomplished without appreciable shrinking, or cracking and normally in much shorter time than if water alone were the vehicle.

Furthermore, the organic acids and/or their derivatives, like water, can function as a plasticizer in a matrix of cellulose ethers as methylcellulose and/or their derivatives when present in a relatively large amount $\geq 5\%$ (based on powders). Therefore a replacement of water by these organic acids and/or their derivatives does not adversely affect rheology for forming processes such as extrusion. In fact a forming mixture can be advantageously modified in texture by the presence of these organic acids and/or their derivatives. For example, such mixtures are less sticky for ease in clean-up of equipment. Mixture theology is enhanced for better forming, e.g. extrusion. The good compatibility of these organic acids and/or their derivatives and a matrix of cellulose ethers and/or their derivatives as reflected in an efficient plasticizer role of oleic acid can enable high boiling solvents such as oleic acid to replace water in a mixture in a large quantity, thus resulting in reduction of water for a fast, crack-free drying.

The desirable properties of heat-treated or sintered bodies such as strength and adsorption properties are preserved.

A wet mixture is first formed of the following components: powders of ceramic, glass, glass-ceramic, molecular sieve, preferably zeolite, activated carbon, and combinations of these, plasticizing organic binder which can be cellulose ethers and/or their derivatives, vehicle and optional additions of organic and inorganic cobinders, surfactants, and lubricants.

Unless otherwise indicated, the weight percents of the mixture components other than the powders, i.e., the various binders and vehicle are based on the powder content according to the following formula:

$$\frac{\text{wt. of component other than powder}}{\text{wt. units of powder}} \times 100.$$

In the case of molecular sieve, e.g. zeolite, the weight of the powder is considered to be the weight of the molecular sieve in addition to the weight of the $SiO_2$ as-fired which would be the $SiO_2$ content resulting from firing of the silicone resin:

$$\frac{\text{wt. of component other than powder and } SiO_2 \text{ as-fired}}{\text{wt. molecular sieve} + SiO_2 \text{ as-fired}} \times 100$$

The powders

The invention is especially suited to powders of high surface area, that is, having a surface area as measured by $N_2$ BET of at least about 300 m²/g, and usually at least about 400 m²/g.

Activated carbon powders

Activated carbon is characterized by a very high surface area, generally above about 500 or 600 m²/g, and a microstructure having a fissured surface and internal microporosity of pore sizes in the range of about 2 to about 10 angstroms. A primary tool for the characterization of activated carbon is BET surface area measurement using nitrogen adsorption.

Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

For hydrocarbon adsorption applications, the preferred type of activated carbon is what is considered to be a collection of very small graphitic platelets which are bound together with an open structure leading to high surface area.

(1) One advantageous type of activated carbon is that having an average particle size of about 3 to 10 micrometers in diameter and surface area as measured by $N_2$ BET method of about 1050 to 1300 $m^2/g$.

(2) Another advantageous type of activated carbon is that having about 80% by weight activated carbon particles of (1), and about 20% by weight of the activated carbon particles of average particle size of about 10 to 50, preferably 20–50 micrometers in diameter and a surface area as measured by $N_2$ BET method of about 1300 to 1350 $m^2/g$.

One source of activated carbon type (1) suitable for use in this invention is BPL F3 activated carbon available from Calgon Corp. in several particle sizes and at different measurements of surface area. A particular preferred variety of activated carbon from this source is the "6×16" mesh size, which is available at a surface area of about 1050 to about 1300 $m^2/g$.

Another especially suited combination of activated carbon powders is 80% Calgon Carbon BPL-F3$^R$ and about 20% Nuchar$^R$ SN-20 which is a coarse powder available from Westvaco, having an average particle size of about 20–50 and usually about 30 micrometers in diameter and a surface area as measured by $N_2$ BET method of about 1300–1350 $m^2/g$.

Molecular sieve powders

Molecular sieves are crystalline substances having pores of size suitable for adsorbing molecules.

Some types of molecular sieves which are preferred for the practice of the present invention are carbon molecular sieves, zeolites which are especially suited and are preferred, aluminophosphates, metallophosphates, silicoaluminophosphates, and combinations of these.

Carbon molecular sieves have well defined micropores made out of carbon material.

Some preferred zeolites are faujasite type, especially preferred of which is Y zeolite, pentasil preferred of which are ZSM type such as ZSM-5 most preferred of which have $SiO_2/Al_2O_3$ mole ratios of greater than about 25, and mordenite, and beta, and combinations of these.

Especially suited to the practice of this invention are zeolites having a surface area of at least 400 $m^2/g$, e.g., Y zeolite having a surface area of at least 600 $m^2/g$ and ZSM-5 zeolite having a surface area of at least 400 $m^2/g$.

A zeolite can be used as formed or ammoniated, but is preferably in the $H^+$ form, or ion exchanged with an alkali or alkaline earth metal but preferably with a transition metal, e.g., atomic number 21 thru 79, as a noble metal, eg., Pt or Pd, etc., as is known in the art depending on the adsorption or conversions which are desired.

Ceramic, glass ceramic and glass powders

It is to be understood that any powders included under the above class or which when fired yield materials in the above described class can be used. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride or mixtures of these.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™, calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a particle size of about 6–8 micrometers, and a surface area of about 5–8 $m^2/g$, such as Pfizer talc 95-27, and 95-28.

Some typical aluminas are coarse aluminas, for example, Alcan C-700 series, such as those having a particle size of about 4–6 micrometers, and a surface area of about 0.5–1 $m^2/g$, eg., C-701™, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In general, the powder material is fine powder (in contrast to coarse grained materials) some components of which can either impart plasticity, such as clays, when mixed with a vehicle such as water, or which when combined with organic materials such as methylcellulose or polyvinyl alcohol can contribute to plasticity.

The organic Binder

The organic binder imparts plasticity to the mixture. Organic binder according to the present invention refers to thermally gellable binders: cellulose ether type binders and/or their derivatives, most typically methylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Advantageously methylcellulose and/or methylcellulose derivatives are used in the practice of the present invention. Methylcellulose, hydroxypropyl methylcellulose, and combinations thereof are especially preferred. Preferred sources of cellulose ethers and/or derivatives thereof, are Methocel$^R$ A4M and K75M from Dow Chemical Co. Methocel$^R$ A4M is a methylcellulose binder having a gel temperature of 50°–55° C., and a gel strength of 5000 g/cm$^2$ (based on a 2% solution at 65° C.). Methocel$^R$ K75M is hydroxypropyl methylcellulose.

The co-binders

According to this invention co-binder can be an organic binder that can be used to enhance the plasticity characteristics of the mixture. Polyvinyl alcohol (PVA) and silicone resins have been found suitable to use as a co-binders. Co-binder can be an inorganic binder such as bentonite clay that is used to enhance strength in the formed body.

The silicone resin can be any one or combination of silicone resins available commercially today. The preferred resins are crosslinkable silicones containing reactive silanol groups. The silicone resin is added to the mixture in the form of an aqueous emulsion of silicone in water. Ready prepared emulsions are available commercially. For example, some especially suitable commercial silicone resin emulsions are resin 1-0468 and 1-0469, which are supplied by Dow Corning. Resin 6--2230 from Dow Corning is in powder form and can be added to the mixture with an appropriate solvent such as isopropyl alcohol or pre-dissolved in dibasic ester solvent. All yield about 50% SiO$_2$ on heat-treating.

Bentonite refers to a class of clays containing montmorillonite as the essential mineral. This type of clay contains aluminum silicate with about 3–4 wt. % MgO. This is a very fine clay which can contribute plasticity to a mixture and contribute bonding power to both the as formed and the dried bodies. Different grades of bentonite are available from different suppliers and can vary somewhat in particle size and impurities depending on the deposit from which they come and on the degree of processing. The clay is of fine particle size for even distribution throughout the mixture. Generally the average particle size of the bentonite is less than one micrometer in diameter. Suitable bentonite clays, especially as far as fine particle size, are those which are similar to that which was in the past supplied by Georgia Kaolin under the name of Bentolite L$^R$. Another suitable bentonite clay is supplied by Dry Branch Kaolin under the name of Bentonite K-129.

One especially suitable combination of co-binders is polyvinyl alcohol, silicone resin, and bentonite clay.

The vehicle

The vehicle is composed of water and at least one additional high boiling water immiscible component which can be oleic acid, linoleic acid, linolenic acid, ricinoleic acid and their derivatives. The procedure is especially suited to water and oleic acid. However, mixtures of the acids and/or their derivatives can be used. For example, a commercial tall oil fatty acid produced from Westvaco: L-1, L-5, 1470, and 1483 which generally contains a mixture of oleic and linoleic acids of about 90% can be used. Westvaco L-5 is a mixture of oleic acid and linoleic acid and is especially suited for drying zeolite mixtures.

The total vehicle content in the mixture is at least about 35% by weight based on the powders, and advantageously about 60% to 200%.

One advantageous vehicle composition is oleic acid and water with the oleic acid content being about 5% to 110% by weight based on the powder content in the mixture. At these levels it is advantageous that the water content in an activated carbon mixture be about 160% by weight based on the carbon, while for a zeolite mixture the water content is advantageously about 70% to 90% by weight based on the zeolite and SiO$_2$ as fired, and for a ceramic mixture the water content is advantageously about 30% by weight based on the ceramic powder. These vehicle compositions afford a special advantage of improved rheology in the respective mixtures.

An especially advantageous vehicle composition when the powder is activated carbon is oleic acid and water with the oleic acid content being about 20% to 110% by weight based on the activated carbon content. This vehicle composition results in short drying times without cracking the activated carbon body.

An advantageous vehicle composition when the powder is zeolite is oleic acid and water with the oleic acid content being about 10% to 60% and more advantageously about 20% to 60% by weight based on the powder content which is taken to be the zeolite in addition to SiO$_2$ measured on an as-fired basis. This vehicle composition results in short drying times without cracking the activated carbon body.

Some mixtures that can be used in the practice of this invention are given below although it is to be understood that any mixture of the above components can be used.

The preferred powders are activated carbon or zeolite. With activated carbon and zeolite, the co-binders are advantageously silicone resin or a combination of silicone resin and bentonite clay.

Another advantageous co-binder system for activated carbon mixtures is a mixture of bentonite clay and polyvinyl alcohol.

1. Activated carbon, plasticizing organic binder, co-binders of PVA, silicone resin, and bentonite, water, and oleic acid. For example one advantageous composition is activated carbon composed of about 80–100% BPL, balance Nuchar, about 0–2% PVA, about 4–8% methylcellulose, about 20–50% silicone resin, and about 10–30% bentonite clay and total vehicle content of about 150–200%, of which about 20–110% is oleic acid.

2. Zeolite, plasticizing organic binder, silicone resin co-binder preferably dissolved in dibasic ester solvent, water, and oleic acid. For example one advantageous composition is Y zeolite, about 4–10% methylcellulose, silicone resin to yield about 5–30% SiO$_2$ on firing (predissolved in dibasic ester), about 70–95% zeolite, and about 60–90% total vehicle, vehicle being composed of about 30–80% water, and about 10–60% oleic acid.

More details on processing of these systems will be described in the Examples that follow.

3. Ceramic, glass, and/or glass ceramic powder, plasticizing organic binder, optional PVA co-binder, and vehicle of water and oleic acid. For example, any of those powders compositions previously given, up to about 12% organic binder which is most typically methylcellulose or hydroxypropyl methylcellulose, up to about 6% PVA, and vehicle of water and oleic acid in amount sufficient to wet the powders.

The mixture is formed by dry blending the solid components and then mixing the liquid components with water. One technique of mixing, although it is to be understood that the invention is not limited to such is to place the dry blended components in a mix muller or other type of mixer such as a sigma blade or double arm mixer. While the solids are being mixed, the liquids (co-binders and vehicle) are added. Oleic acid can be added prior to the addition of any other liquid component. For example, with activated carbon powder mixtures, plasticizing organic binder e.g., methylcellulose, PVA, bentonite, and carbon powders are mixed with oleic acid as in a Littleford mixer for generally about 3 minutes. For zeolite powders, the zeolite is mixed with the oleic acid for about 3 minutes. Plasticizing organic binder e.g., methylcellulose is then added with additional mixing for about 3 minutes. Once the liquid has been added, the muller or other mixer is run until the batch compacts and becomes plasticized.

The vehicle content in the mixture can be adjusted in order to impart optimum plasticity and handleability to the mixture. As the mixture is being mixed and vehicle is being added, a point is reached at which the vehicle is sufficient to wet all the particles. Continued mixing compacts the powder by removing air, and the compacted powder starts to agglomerate into lumps. Continued mixing results in these lumps becoming plastic. Excess water makes these lumps too soft for the forming process.

Once the mixture is observed to be well plasticized, as indicated by hand or torque rheometer, it is formed into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), about 31 cells/cm$^2$ (about 200 cells/in$^2$), about 15 cells/cm$^2$ (about 100 cells/in$^2$) or about 1.4 cells/cm$^2$ (9 cells/in$^2$). Typical wall (web) thicknesses in catalytic converter applications, for example, are about 6 mils (about 0.15 mm) for 400 cells/in$^2$ (62 cells/cm$^2$) honeycombs. Web thicknesses range typically from about 4 to about 35 mils (about 0.1 to about 0.9 mm). The external size and shape of the body is controlled by the application.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried.

Prior to this invention for mixtures requiring a high water content i.e., at least about 50% water which require slow drying to prevent cracking were dried by a technique of wrapping the bodies in aluminum foil and placing them in a dryer set at no higher than about 100° C., typically at about 95° C. for a sufficient time to remove the water. The foil creates a humid environment so that the extruded bodies dry slowly and uniformly thus preventing cracking. Drying time can vary depending on the size of the body. For a 2.54 cm (1") diameter, 22.9 cm (9") long honeycomb, the drying time is typically about 4 days.

According to this invention, a portion of the water vehicle is replaced by the previously described organic acids and/or their derivatives, without appreciable affecting batch extrusion rheology. Results have shown that as water was reduced by the substitution of approximately an equivalent amount of oleic acid in an activated carbon or zeolite batch, for example, honeycomb samples were dried faster, thus reducing very substantially the drying time of an extruded carbon or zeolite honeycombs.

For conducting powders, e.g., activated carbon, the drying method according to the present invention involves a humidity control procedure which can be preceded by microwave drying to remove a portion of the vehicle.

Typically the relative humidity control procedure is carried out according to the following schedule.

| Step | T °(C.) | RH (%) | t (hrs.) |
|------|---------|--------|----------|
| 1 | 35–90 | 90–95 | 1–7 |
| 2 | 88–95 | 90–95 | 1–7 |

After steps 1 and 2, it is preferred to carry out the following additional steps:

| | | | |
|---|---|---|---|
| 3 | 90–95 | 90–80 | 2–6 |
| 4 | 90–95 | 80–70 | 2–6 |
| 5 | 90–60 | 70–60 | 2–6 |
| 6 | 60–30 | 60 | 2–6 |

For conducting material, the green body can be preferably pre-dried under microwave radiation for a length of time immediately prior to arcing. The length of time can be determined experimentally and will depend on sample size and on the particular oven.

If the material is non-conducting e.g., zeolite, ceramic, glass ceramic, glass, the drying is by either microwave or dielectric drying. The drying time depends on the amount of water, the size of the body and on the particular oven. For example, a honeycomb measuring about 20.3 cm (8") long and about 2.54–10.2 cm (1–4") in diameter, the drying time is typically less than about 15 minutes.

Microwave and dielectric drying techniques are well-known in the art. Those skilled in the art can adjust the dielectric dryer in known ways to obtain low power drying, such as adjusting plate height, adjusting RF voltage, or adjusting drying time.

Microwave and dielectric drying take a very short time. However, because dielectric drying is so fast, bodies containing a large amount of water normally tend to crack during the process due to a large non-uniform shrinkage. However, use of an organic acid and/or derivative as part of the vehicle according to this invention allows for non-conducting material bodies to be dried by these fast techniques without the cracking seen in prior art methods in which water alone is the vehicle, due to much less non-uniform shrinkage.

Depending on the powder, the dried bodies can be heat-treated or sintered.

With an activated carbon body, the dried body is heat-treated to restore surface area to the body which might have been lost by the presence of the binder, clay, and resin. The temperatures for this heat-treatment step are usually about 1000° C. to 1400° C. for about 2 to 4 hours in a non-reacting atmosphere e.g., nitrogen. The heat-treatment temperature is more advantageously about 1100° C. to 1300° C.

With certain ceramic, glass, or glass ceramic materials, and zeolite, the dried bodies are sintered as known in the art.

The bodies remain crack-free after heat-treating or sintering.

Up to this time it was impossible to obtain crack-free honeycombs, especially large (about 12 cm or 4.75") diameter honeycombs dried either at room temperature or in an oven wrapped in foils, due to the large shrinkage (thus large stresses developed) in the samples resulting from removal of a large amount of water.

Use of a nearly equivalent amount of oleic acid to replace water as part of the vehicle composition in a mixture containing high surface area powders does indeed reduce the drying shrinkage and stress induced for a crack-free body whether standing at room temperature or dried rapidly in a dielectric oven to cut down drying time. Also the rheology of the mixture is enhanced to yield a perfect skin quality and cell knitting due to an effective plasticizing effect of oleic acid. Such bodies can still be fired or sintered to obtain crack-free products.

In cases where the very fine cracks occur after drying but are not visible to the eye, sintering will show up these invisible cracks, especially in large bodies, e.g. (12 cm) 4.75" honeycombs. Therefore the advantages of the invention can be seen especially in large sintered bodies. Even if cracking due to drying is not a problem due to the plasticizing effect of the organic acids and/or their derivatives, there is still an advantage of adding the organic acids and/or their derivatives as part of the vehicle according to this invention even in relatively small amounts to enhance extrusion rheology so as to ensure against the possibility of cracking, especially in large sintered bodies.

For rheology enhancement the range of effective oleic acid levels (wt % based on powder) can be about 5–110% for a carbon batch, about 5–60% for a zeolite batch based on the zeolite and $SiO_2$ as fired, and about 5–30% for a ceramic, e.g. cordierite raw material batch.

To more fully illustrate the invention, the following non-limiting examples are presented. All parts, portions, and percentages are on a weight basis unless otherwise stated.

EXAMPLE 1 (comparative)

For comparison, the old drying method of wrapping a 22.3 cm (8.5") long sample with a foil at 95° C. would take 4 days to complete the drying. The sample was formed from a mixture of activated carbon which was about 80% BPL-F3$^R$ and about 20% Nuchar$^R$ SN-20, about 6% Methocel A4M, about 2% PVA, 20% silicone resin 1-0469, and about 20% Bentolite L$^R$ bentonite clay.

The following drying data in Table 1 supported the need of 4 days:

TABLE 1

| Days at 95° C. | 0 | 1 | 2 | 3 | 4 | 5 |
|---|---|---|---|---|---|---|
| Weight of sample (g) | 84.00 | 72.83 | 53.90 | 43.07 | 40.32 | 40.27 |

Results of studies on various effects of oleic acid compositions are summarized in the following examples.

EXAMPLE 2

The addition of oleic acid was done by adding a specific amount of oleic acid to a dry carbon batch in a Littleford mixer and mixing for about 3 minutes. The treated powders were then introduced into a muller where the rest of the liquids were added to plasticize the mixture. Honeycombs having a diameter of 2.54 cm (1") were dried in a relative humidity controlled oven (RHO) with a special relative humidity (RH) temperature (T), time (t) drying program.

The three schedules used in the-current studies were:

| Step | T °(C.) | RH (%) | t (hrs.) |
|---|---|---|---|
| Schedule A | | | |
| 1 | 35–90 | 95 | 5 |
| 2 | 90 | 95 | 5 |
| 3 | 90 | 95–80 | 10 |
| 4 | 90 | 80–70 | 10 |
| 5 | 90–60 | 70–60 | 10 |
| 6 | 60–30 | 60 | 10 |
| | | Total | 50 |
| Schedule B | | | |
| 1 | 35–90 | 90 | 5 |
| 2 | 90 | 90 | 5 |
| 3 | 90 | 90–80 | 10 |
| (Steps 4, 5, and 6 similar to Schedule A) | | | |
| | | Total | 50 |
| Schedule C | | | |
| (The first 2 steps similar to Schedule B) | | | |
| 3 | 90 | 90–80 | 5 |
| 4 | 90 | 80–70 | 5 |
| 5 | 90–60 | 70–60 | 5 |
| 6 | 60–30 | 60 | 5 |
| | | Total | 30 |

Various compositions of activated carbon, bentonite clay and silicone resin, oleic acid and water were extruded into honeycombs.

The SR emulsion 1–0469 and GK-129 Bentonite clay were used. Honeycomb samples were produced using a die configuration of 200 cpsi/20 mil wall/18 mil skin. A few were dried under a specific RHO schedule, while the rest were still dried in foil at about 95° C./4 days. After drying, all were cured (230° C./30 min.) and heat-treated at 1100° C./4 hrs./nitrogen. Strength measurements were done on foil-dried samples. The samples dried in a RHO were solely for drying schedule study.

TABLE 2

THE MAXIMUM AMOUNT OF OLEIC ACID

| Water/ oleic(%) | RHO Sch. | Strength (psi) | | | |
|---|---|---|---|---|---|
| | | RT | 250° C. | 300° C. | 350° C. |
| 2-1  157/ 0 (control) | | 1020 | 1100 | 930 | 860 |
| 2-2  107/40 | A | 680 | 650 | 680 | 630 |
| 2-3  87/60 | A | 1020 | 1000 | 900 | 850 |
| 2-4  75/80 | B | 530 | 560 | 650 | 460 |
| 2-5  68/100 | C | 240 | 260 | 270 | 220 |
| 2-6  65/80 | C | 1690 | 1670 | 1810 | 1570 |

The carbon was about 80% BPL-F3$^R$ and about 20% NucharR SN-20.

TABLE 2-continued

THE MAXIMUM AMOUNT OF OLEIC ACID

| Water/ oleic(%) | RHO Sch. | Strength (psi) | | | |
|---|---|---|---|---|---|
| | | RT | 250° C. | 300° C. | 350° C. |

Mixtures contained about 6% A4M Methocel and about 2% PVA and about 20% GK 129 bentonite.
Nos. 2-1 to 2-5 contained about 20% SR, and No. 2-6 contained about 40% SR.

From above data, it was established that a nearly one to one replacement of oleic acid for water can be achieved in an activated carbon batch without affecting appreciably its rheology/extrusion quality. However, with a high 100% acid (No. 2–5), the extrudate was softer. All samples could be dried in a relative humidity controlled oven neatly (with no damp oleic acid trace) and completely (confirmed by following the sample weights during drying) in the specified schedule of 50 or 30 hours (vs ~150 hrs. for a control sample, No. 2–1, without oleic acid in a RH oven).

All samples showed excellent water stabilities. The strength fell off sharply as the acid content increased from 0% (No. 2–1) to 100% (No. 2–5) in a 20% SR/20% GK composition. However, the strength remained high (>1000 psi) even with the presence of 80% oleic acid in a batch, if a high (40%) SR emulsion was used (No. 2–6). This suggested that the curing of silicone resin present in a large (>20%) amount in a batch would not be affected appreciably by oleic acid.

In short, an equivalent replacement of oleic acid for water in a carbon batch could indeed cut down drying time very substantially (from about 150 to 30 hrs.) in relative humidity controlled drying with no adverse effect on extrusion quality due to the plasticizing effect of oleic acid. The maximum level of acid was around 100%. The cured and heat-treated sample showed no effect on water stability, but had poor strength (the higher the acid content, the lower the strength). However, strength can be restored if a high (40%) level of SR was used.

EXAMPLE 3

The following tests were done to assess the drying efficiency of bodies made from activated carbon and silicone resin mixtures having the following composition and given in Table 3 below: activated carbon as 80% BPL/20% Nuchar, 2% PVA as Airvol 205S, 6% methylcellulose as Methocel$^R$ A4M, 40% silicone resin as 1–0469 and 20% bentonite clay as Bentolite L, except No. 3–5 which was about 20% silicone resin, and vehicle as given Table 3. Honeycomb samples of 1" in diameter and 8.5" long and having 200 cpsi/20 mil wall/18 mil skin were dried in a relative humidity controlled oven (RHO) under a 30 hour schedule (Schedule C) with or without a predrying in a microwave oven (MWO).

TABLE 3

Drying of carbon/SR samples containing oleic acid

| | Water/oleic (%) | MWO (min.) | RHO Residual water (%) |
|---|---|---|---|
| 3-1 (Control) | 165/0 | 0 | 10 |
| | | 2–3 | 11–12 |
| 3-2 | 95/60 | 0 | 2 |
| | | 1–2.5 | 1 |
| 3-3 | 73/80 | 0 | 3 |
| | | 1–2 | 3 |
| 3-4 | 65/80 | 0 | 2 |
| | | 1–1.5 | 0 |
| 3-5 | 68/100 | 0 | 0 |
| | | 1–1.5 | 0 |

From Table 3 it can be seen that control sample 3–1 with only water as the vehicle could not be dried completely in 30 hours according to schedule C (left with ≧10% residual water). However, all mixtures containing oleic acid (3-2, 3-3, 3-4, and 3-5 with increasing acid and decreasing water contents) could be dried completely or nearly completely in the same 30 hour schedule. Thus the above data clearly show that use of oleic acid to replace water in a mixture containing powders with high surface areas (thus requiring a large amount of water for complete plasticization) can substantially reduce the drying time (from 150 hours to 30 hours in a relative humidity oven).

The nearly 1 to 1 replacement of oleic acid for water in the above mixtures did not affect the rheology of the mixture appreciably and still yielded honeycombs with a good skin quality and cell knitting due to the plasticizing effect of oleic acid. The final heat-treated properties of activated carbon honeycombs were very comparable to those obtained from batches without oleic acid.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making a dried crack-free body, the method comprising:
   I. forming a wet mixture comprising
      A. powder having a surface area of at least about 300 $m^2/g$, and being selected from the group consisting of ceramic, glass ceramic, glass, molecular sieve, activated carbon, and combinations thereof;
      B. plasticizing organic binder selected from the group consisting of cellulose ethers, cellulose ether derivatives, and combinations thereof; and
      C. vehicle wherein the vehicle is water and an additional component selected from the group consisting of oleic acid, oleic acid derivatives, linoleic acid, linoleic acid derivatives, linolenic acid, linolenic acid derivatives, ricinoleic acid, ricinoleic acid derivatives and combinations thereof, the vehicle content being about 60% to 200% by weight based on the powder content and said additional component being present in the vehicle in an amount of about 5 to 110% by weight based on the powder in the mixture;
   II. forming said mixture into a green body; and
   III. drying the green body;
   wherein if the powder is electrically conducting, the drying is done by a controlled humidity drying procedure comprising the steps of
      i. heating the green body at a temperature of about 35° C. to 90° C. at a relative humidity of about 90% to 95% for a time of about 1 to 7 hours, and thereafter ii. heating the green body at a temperature at about 88° C. to 95° C. at a relative humidity at about 90% to 95% for about 1 to 7 hours; and if the powder is non-electrically conducting the drying is done by a method selected from the group consisting of microwave drying and dielectric drying.

2. A method of claim 1 wherein the additional component of the vehicle is oleic acid.

3. A method of claim 2 wherein the oleic acid content of the mixture is about 5% to 110% based on the powder content.

4. A method of claim 1 wherein the organic binder is selected from the group consisting of methylcellulose, hydroxybutyl methylcellulose, hydroxypropyl methylcellulose, hydroxyethyl methylcellulose, sodium carboxy methylcellulose, and mixtures thereof.

5. A method of claim 4 wherein the organic binder is selected from the group consisting of methylcellulose, hydroxypropyl methylcellulose, and combinations thereof.

6. A method of claim 1 wherein the powder is selected from the group consisting of activated carbon and zeolite.

7. A method of claim 6 wherein the mixture additionally comprises silicone resin.

8. A method of claim 7 wherein the powder is zeolite

9. A method of claim 8 wherein the surface area of the zeolite is at least 400 $m^2/g$.

10. A method of claim 8 wherein the vehicle is made up of oleic acid and water and the oleic acid content in the mixture is about 5% to 60% based on the zeolite powder and the as-fired silica content in the mixture.

11. method of claim 10 wherein said oleic acid content is about 10% to 60%.

12. A method of claim 8 wherein the zeolite is Y zeolite.

13. A method of claim 6 wherein the powder is activated carbon.

14. A method of claim 13 wherein the surface area of the activated carbon is at least 600 $m^2/g$.

15. A method of claim 13 wherein bentonite clay and polyvinyl alcohol are present in the wet mixture as co-binders.

16. A method of claim 13 wherein the vehicle is oleic acid and water wherein the oleic acid content is about 5% to 110% by weight based on the powder.

17. A method of claim 16 wherein said oleic acid content is about 20% to 110%.

18. A method of claim 1 wherein the forming is done by extruding the mixture through a die.

19. A method of claim 1 wherein the mixture is formed into honeycomb structure.

20. A method of claim 1 wherein the mixture is extruded through a die into a honeycomb structure.

21. A method of claim 1 wherein prior to the controlled humidity drying procedure for a conducting powder, the green body is subjected to pre-drying under microwave radiation for a length of time immediately prior to arcing.

* * * * *